United States Patent [19]
Petersen

[11] Patent Number: 5,992,253
[45] Date of Patent: Nov. 30, 1999

[54] METHOD AND APPARATUS FOR CONVERTING RECIPROCATING MOTION TO SINGLE DIRECTION ROTATIONAL MOTION

[75] Inventor: Paul S. Petersen, Minnetonka, Minn.

[73] Assignee: Bioform Engineering, Inc., Ross, Calif.

[21] Appl. No.: 08/827,917

[22] Filed: Apr. 8, 1997

[51] Int. Cl.$^6$ ............................................. F16H 27/02
[52] U.S. Cl. ........................... 74/132; 74/130; 482/137
[58] Field of Search ........................... 74/130, 131, 132; 482/137, 138

[56] References Cited

U.S. PATENT DOCUMENTS

| | | | |
|---|---|---|---|
| D. 218,107 | 7/1970 | Feather et al. ........................... D34/5 |
| D. 246,812 | 1/1978 | Canter et al. ........................... D6/48 |
| D. 283,636 | 4/1986 | Lepley ................................. D21/194 |
| D. 298,641 | 11/1988 | Sheltra ................................ D21/194 |
| 305,198 | 9/1884 | Kempster . |
| D. 306,892 | 3/1990 | Pitzen ................................. D21/194 |
| 433,202 | 7/1890 | Herrick . |
| 968,355 | 8/1910 | Hopkins et al. . |
| 1,171,763 | 2/1916 | Allen . |
| 1,273,079 | 7/1918 | Matson et al. . |
| 1,412,276 | 4/1922 | Dahl . |
| 1,518,661 | 12/1924 | McElroy, Jr. et al. . |
| 2,085,657 | 6/1937 | Heisdorf et al. .......................... 208/37 |
| 2,114,648 | 4/1938 | Bevier .................................. 280/240 |
| 2,464,952 | 3/1949 | Warburton ............................. 280/225 |
| 3,134,378 | 5/1964 | Harwood ................................. 128/25 |
| 3,205,725 | 9/1965 | Uhtenwoldt ............................. 74/132 |
| 3,877,724 | 4/1975 | Chase .................................. 280/241 |
| 3,891,235 | 6/1975 | Shelly ................................. 280/252 |
| 4,169,609 | 10/1979 | Zampedro ............................. 280/241 |
| 4,188,030 | 2/1980 | Hooper ................................. 272/73 |
| 4,508,358 | 4/1985 | Erel ................................... 280/234 |
| 4,589,656 | 5/1986 | Baldwin ................................. 272/73 |
| 4,618,141 | 10/1986 | Ashworth, Jr. ........................... 272/73 |
| 4,728,099 | 3/1988 | Pitre ................................... 272/72 |
| 4,729,559 | 3/1988 | McNeil .................................. 272/73 |
| 4,757,988 | 7/1988 | Szymski ................................. 272/73 |
| 4,762,317 | 8/1988 | Camfield et al. ......................... 272/73 |
| 4,832,325 | 5/1989 | Okolischan et al. ...................... 269/305 |
| 4,832,332 | 5/1989 | Dumbser ................................. 272/72 |
| 4,858,483 | 8/1989 | Blakemore .............................. 74/143 |
| 4,867,447 | 9/1989 | Johnson ................................. 272/72 |
| 4,923,193 | 5/1990 | Pitzen et al. ........................... 272/73 |
| 4,961,569 | 10/1990 | Roberge ................................. 272/73 |
| 5,007,655 | 4/1991 | Hanna ................................. 280/250.1 |
| 5,050,864 | 9/1991 | Pertramer .............................. 272/73 |
| 5,114,391 | 5/1992 | Pitzen et al. ........................... 482/62 |
| 5,542,893 | 8/1996 | Petersen et al. ......................... 482/72 |

FOREIGN PATENT DOCUMENTS

1329227  5/1994  Canada ......................... A63B 21/00

Primary Examiner—Charles A. Marmor
Assistant Examiner—David Fenstermacher
Attorney, Agent, or Firm—Kinney & Lange, P.A.

[57] ABSTRACT

An apparatus for converting reciprocating motion to single direction rotational motion that includes a frame, a shaft supported by the frame for rotation relative to the frame, a first one-way clutch mounted on the shaft, a first pinion mounted on the first one-way clutch, a second one-way clutch mounted on the shaft a second pinion mounted on the second one-way clutch, a first bearing mechanism mounted on the shaft between the first pinion and the second pinion, a first rack engaging the first pinion for driving the shaft when the first rack is moved in a primary direction at a rate of speed sufficiently fast to overtake the shaft, a second rack engaging the second pinion for driving the shaft when the second rack is moved in a reciprocal direction at a rate of speed sufficiently fast to overtake the shaft, and an actuator in working relation with the first rack and the second rack.

52 Claims, 7 Drawing Sheets

METHOD AND APPARATUS FOR CONVERTING RECIPROCATING MOTION TO SINGLE DIRECTION ROTATIONAL MOTION

BACKGROUND OF THE INVENTION

The present invention generally relates to a method and apparatus for rectifying motion. More specifically, the present invention relates to a method and apparatus for converting reciprocating motion into single direction rotational motion. The present invention further relates to an exercise machine that incorporates the apparatus for converting reciprocating motion into single direction rotational motion.

Devices for converting reciprocating motion into single direction rotational motion are disclosed in the art. For example, the mechanical apparatus for providing upper body exercise that is described in U.S. Pat. No. 4,923,193 generates single direction rotational motion that is derived from reciprocating motion. The apparatus of this patent relies upon a chain-based mechanism for converting reciprocating motion to single direction rotational motion.

The mechanism of U.S. Pat. No. 4,923,193 provides a solution to the problem of "dead points" that arise when a crank arm is connected to a pulley in conventional fashion. However, the need to employ a chain or other type of flexible mechanism, such as a continuous belt, in the mechanism of Pat. No. 4,923,193 produces an undesirable byproduct, namely, an unpleasant jerking sensation to the user stemming from chordal action of the chain. The jerking sensation is caused by changing velocities of sections or linkages of the belt or chain that are associated with changes in the effective radius of action, the well known "chordal effect," during operation of the exercise machine.

U.S. Pat. No. 5,542,893 solves the undesirable jerking sensation problems by replacing the flexible belt or chain with a rack and pinion system. In apparatus 10 of U.S. Pat. No. 5,542,893, as depicted in prior art FIG. 1, a pair of pinions 12, 13 are mounted on respective one-way clutches 14, 15. The one-way clutches 14, 15 are mounted onto a rotatable shaft 16 that is mounted within a frame (not shown).

Figure 1:
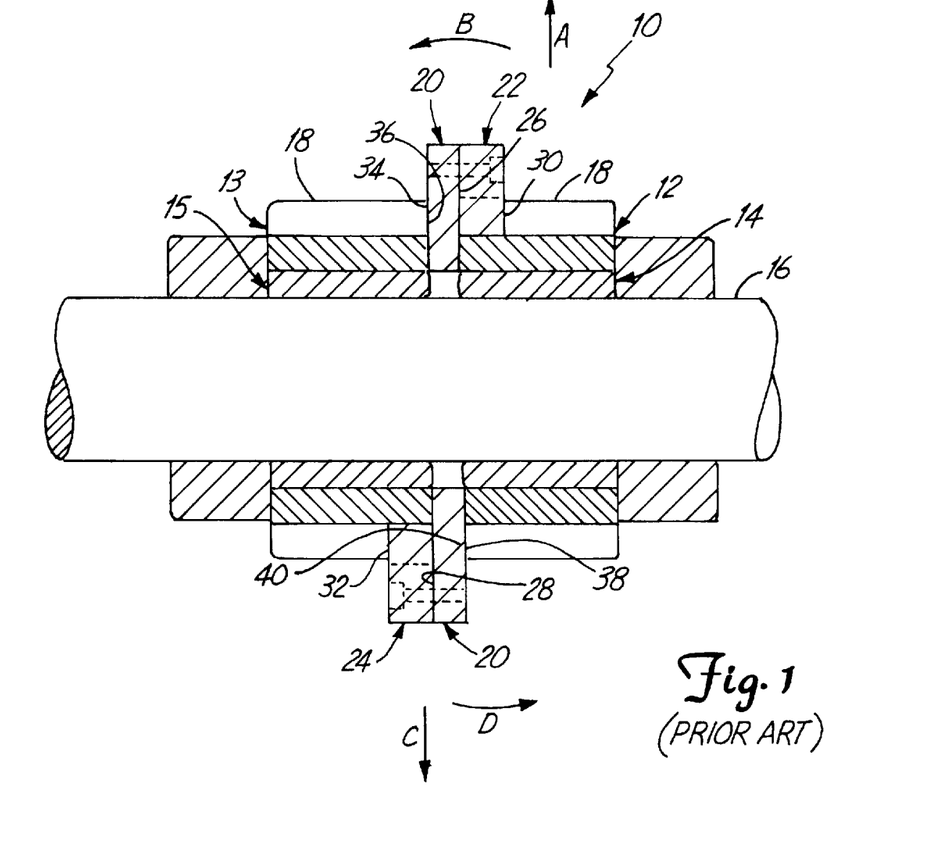
FIG. 1 is a sectional view of a prior art apparatus of U.S. Pat. No. 5,542,893 for converting reciprocating motion into rotational motion.

The pinions 12, 13 each include a plurality of teeth 18 that are spaced about the radius of each pinion 12, 13. The apparatus of U.S. Pat. No. 5,542,893 also includes a yoke 20 and a pair of attached racks 22, 24 that are attached to opposing sides 26, 28 of the yoke 20. The racks 22, 24 each include a plurality of gear teeth 30, 32, respectively, that engage the teeth 18 of the pinions 12, 13, respectively. Rotation of the pinions 12, 13 and the associated one-way clutches 14, 15 in the same direction about the shaft 16 imparts power to the shaft 16 when the speed of the pinions 12, 13 exceeds the rotational speed of the shaft 16.

The one-way clutches 14, 15 are each fixedly mounted, and are each oriented, on the shaft 16 so that the clutches 14, 15, when engaged, each impart power to the shaft 16 in the same rotational direction about the shaft 16, so long as the rotational speed of the clutch 14 or the clutch 15 exceeds the rotational speed of the shaft 16. The clutches 14, 15 do not each impart power to the shaft 16 at the same time. Rather, when the yoke 20 and attached rack 22 are moved in a primary direction to engage the pinion 12, the clutch 14 imparts power to the shaft 16 to increase the rotational speed of the shaft 16 so long as the speed of the rack 22 is greater than the speed of the shaft 16, whereas the clutch 15 freewheels with respect to the shaft 16. Conversely, when the yoke 20 and attached rack 24 are moved in a reciprocal direction to the primary direction, the rack 24 engages the pinion 13 and the clutch 15 imparts power to the shaft 16 to increase the speed of the shaft 16 so long as the speed of the rack 24 in the reciprocal direction is faster than the speed of the rotatable shaft 16, whereas the clutch 14 freewheels with respect to the shaft 16. Thus, whenever the yoke 20 and rack 22 are moving in the primary direction to engage the pinion 12, the one-way clutch 15 is free wheeling. Conversely, whenever the yoke 20 and rack 24 are moved in the reciprocal direction to the primary direction to engage the pinion 13, in place of "the one-way clutch 15 is free wheeling."

This structure of the motion conversion apparatus of U.S. Pat. No. 5,542,893 avoids the undesirable jerking sensation associated with the chain-based mechanism of U.S. Pat. No. 4,923,193. However, it has been discovered that operation of this apparatus 10 that is disclosed in U.S. Pat. No. 5,542,893 creates some frictional forces that undesirably reduce the efficiency of the apparatus 10 and can cause significant wear of some system 10 components.

Specifically, when the yoke 20 and rack 24 are moved in the primary direction, radial forces acting in the direction of arrow A create a moment in the direction of arrow B that tends to cause the yoke 20 to rotate in the direction of arrow B. This movement of the yoke 20 in the direction of arrow B is arrested by contact between surface 34 of the yoke 20 and surface 36 of the pinion 13 and by contact between the surface 38 of the yoke 20 and surface 40 of the pinion 12.

This contact between the surfaces 34, 36 and between the surfaces 38, 40 does prevent the teeth 30 of the rack 22 from becoming disengaged with the teeth 18 of the clutch 14. However, the enhanced contact between the surfaces 34, 36 and between the surfaces 38, 40 is nevertheless undesirable due to increased frictional forces that arise from this rubbing contact of the surfaces 34, 36 and the surfaces 38, 40. Furthermore, the potential for significant wear exists where the surfaces 34, 36 contact each other and where the surfaces 38, 40 contact each other. This wear and friction concern is especially pronounced where the surfaces 38, 40 contact each other, since the yoke 20 and the pinion 12 are moving in opposite directions at a net speed of two times the primary speed where the surfaces 38, 40 contact each other.

A similar friction and wear problem arises when the yoke 20 and rack 24 are moved in a direction that is reciprocal to the primary direction. Here, a separation force in the direction of arrow C arises due to the interaction of the gear teeth 32 of the rack 24 and the gear teeth 18 of the pinion 13. This force in the direction of arrow C creates a radial moment in the direction of arrow D that tends to cause the yoke 20 to rotate in the direction of arrow D. This rotation pressures the surfaces 34, 36 against each other and also pressures the surfaces 38, 40 against each other.

This contact between the surfaces 34, 36 and between the surfaces 38, 40 does prevent the teeth 32 of the rack 24 from becoming disengaged with the teeth 18 of the pinion 13. However, the enhanced contact between the surfaces 34, 36 and between the surfaces 38, 40 is nevertheless undesirable due to increased frictional forces that arise from this rubbing contact of the surfaces 34, 36 and the surfaces 38, 40. Furthermore, the potential for significant wear exists where the surfaces 34, 36 contact each other and where the surfaces 38, 40 contact each other When the yoke 20 and rack 24 are moved in the reciprocal direction to the primary direction, the enhanced contact is most problematic at the surfaces 34, 36, since such reciprocal direction movement causes the surfaces 34, 36 to move against each other in opposite directions at a net speed of two times the speed of the yoke 20 in the reciprocal direction.

A solution is needed to the surface contact problems that arise when the yoke 20 tends to rotate in the direction of arrow B during movement of the yoke 20 in the primary direction and the related tendency of the yoke 20 to move in the direction of arrow D during movement of the yoke 20 in the reciprocal direction. Such a solution is desirable because the enhanced pressure at the surfaces 34, 36 and at the surfaces 38, 40 due to the rotation tendency of the yoke 20 in the direction of arrow B or in the direction of arrow D creates the potential for enhanced wear where the surfaces 34, 36 contact each other and where the surfaces 38, 40 contact each other. Additionally, the enhanced frictional forces at the surfaces 34, 36 and at the surfaces 38, 40 significantly reduce the efficiency at which motion in the primary and the reciprocal direction is converted to single direction rotational motion via the pinions 12, 13 and respective one-way clutches 14, 15.

SUMMARY OF THE INVENTION

The present invention provides an apparatus for converting reciprocating motion to single direction rotational motion in a predetermined direction. The apparatus includes a frame, a shaft that is supported within the frame for rotation of the shaft relative to the frame, and first and second one-way clutches that are mounted on the shaft. The apparatus also includes a first pinion that is mounted on the first one-way clutch and a second pinion that is mounted on the second one-way clutch. The apparatus further includes a bearing mechanism that is mounted about the shaft between the first pinion and the second pinion. The apparatus also includes a first rack engaging the first pinion for driving the shaft when the first rack is moved in a primary direction at a rate of speed sufficiently fast to overtake the shaft and a second rack engaging the second pinion for driving the shaft when the second rack is moved in a reciprocal direction at a rate of speed sufficiently fast to overtake the shaft. The apparatus additionally includes an actuator that is in working relation with the first rack and the second rack. The present invention further includes a method of converting reciprocating motion to single direction rotational motion.

DETAILED DESCRIPTION OF THE PREFERRED EMBODIMENTS

Figure 2:
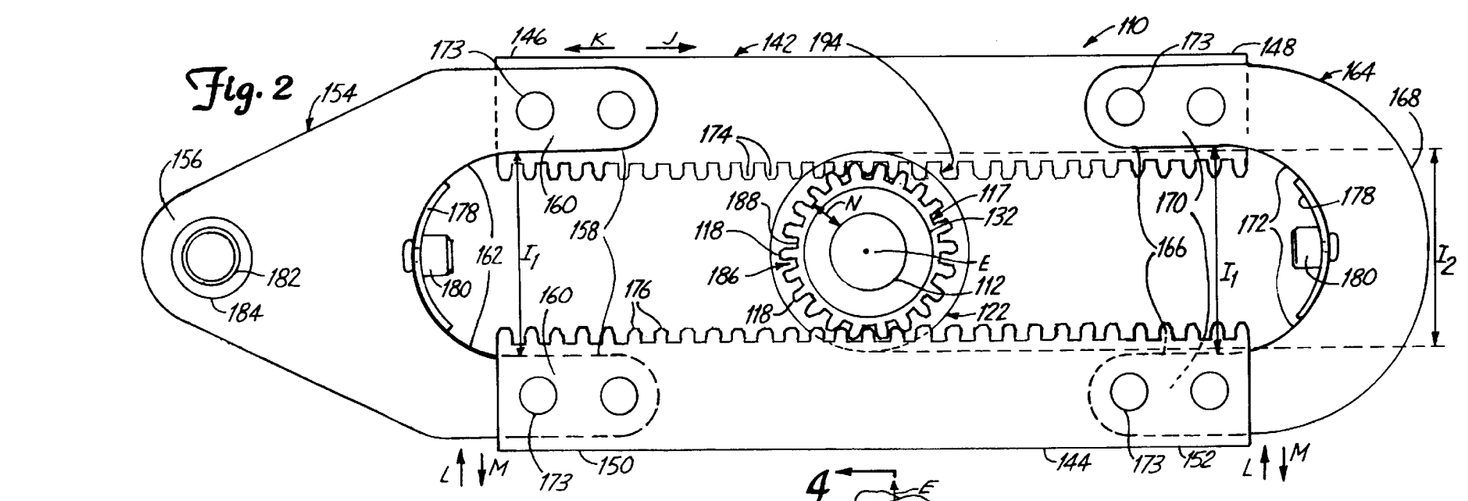
FIG. 2 is a side plan view of the device of the present invention for converting reciprocating motion to unidirectional rotational motion.
Figure 4:
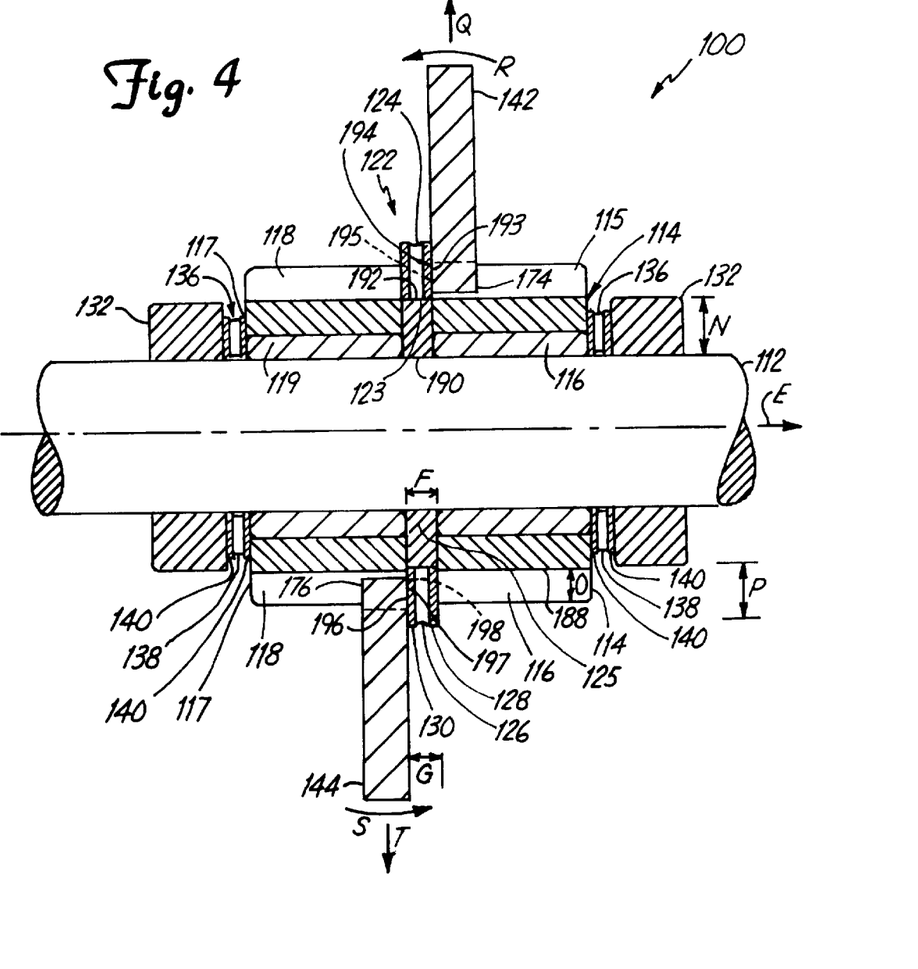
FIG. 4 is a sectional view taken along lines 4—4 of FIG. 3.

An apparatus for converting reciprocating motion to single direction rotational motion in accordance with the present invention is generally depicted at 110 in FIG. 2. The apparatus 110 includes a shaft 112 with a longitudinal axis E that is set in a frame (not shown) for rotation of the shaft 112 relative to the frame. As best depicted in FIG. 4, the apparatus 110 also includes a pinion 114 having teeth 115. The pinion 114 is mounted on a one-way clutch 116 that is fixedly mounted on the shaft 112. Thus, the one-way clutch 116 separates the pinion 114 from the shaft 112. The apparatus 110 also includes a pinion 117 having teeth 118. The pinion 117 is mounted on a one-way clutch 119 that is fixedly mounted on the shaft 112. Thus, the one-way clutch 119 separates the pinion 117 from the shaft 112.

Throughout the drawings, like elements are referred to using like reference characters.

The apparatus 110 further includes a bearing mechanism 122 that is mounted about the shaft 112 and separates the pinion 114 from the pinion 117. The bearing mechanism 122 has both an inner radial surface 123 and an outer radial surface 124. The apparatus 110 further includes a centering ring 125 that is freely mounted on the shaft 112. The bearing mechanism 122 is freely mounted onto the centering ring 125 so that the centering ring 125 both centers the bearing mechanism 122 with respect to the longitudinal axis E of the shaft 112 and positions the bearing mechanism 122 appropriately with respect to the teeth 115, 118 of the pinions 114, 117, as explained more fully below.

The centering ring 125 has a thickness F that is slightly less than a thickness G of the bearing mechanism 122 so that the centering ring 125 fully supports all components of the bearing mechanism 122 without permitting the centering ring 125 to come into contact with either the pinion 114, the one-way clutch 116, the pinion 117, or the one-way clutch 119. Contact between the centering ring 125 and either of the pinions 114, 117 or either of the clutches 116, 119 would introduce unnecessary friction during operation of the apparatus 110 and would thereby undesirably reduce the efficiency of the motion conversion by the apparatus 110.

The bearing mechanism 122 may take the form of a roller thrust bearing 126 and a pair of thrust washers 128, 130 that surround the roller thrust bearing 126, The thrust washers 128, 130 preferably have the same inner and outer diameter as the thrust bearing 126 and are preferably positioned on the centering ring 125. With this arrangement, the thrust washer 128 separates the thrust bearing 126 from the pinion 114 and the thrust washer 130 separates the thrust bearing 126 from the pinion 117. As explained more fully below, the centering ring 125 preferably positions the bearing mechanism 122 so that the thrust washer 128 does not come into contact with the clutch 116 and so that the thrust washer 130 does not come into contact with the clutch 119.

The apparatus 110 also includes a pair of clamping members, such as clamping collars 132, that are locked onto the shaft 112. The collars 132 are positioned on opposing sides of the pinion 114 and the pinion 117 to secure the pinions 114, 117 against the bearing mechanism 122. One collar 132 may be positioned directly against the pinion 114 and the other collar 132 may be positioned directly against the pinion 117. Nonetheless, the apparatus 110 preferably includes a pair of bearing mechanisms 136 that separate the collars 132 from the pinions 114, 117. Without the bearing mechanisms 136, significant and undesirable friction and wear would be expected to arise between contacting surfaces of the pinion 114 and the adjacent collar 132 and between contacting surfaces of the pinion 117 and the adjacent collar 132. The bearing mechanisms 136 are mounted directly onto the shaft 112 and do not require a centering ring, such as the centering ring 125 that accompanies the bearing mechanism 122.

The bearing mechanisms 136 may each take the form of a roller thrust bearing 138 and a pair of adjacent thrust washers 140 that arc positioned on opposing sides of the thrust bearing 138. It is possible to exclude the thrust washers 140 so that one of the thrust bearings 138 rides directly against the pinion 114 and the collar 132 associated with the pinion 114 and so that the other thrust bearing 138 rides against the pinion 117 and the collar 132 associated with the pinion 117. However, it is preferable to include the thrust washers 140 on opposing sides of each thrust bearing 138. The reason for this preference is that the rollers within the thrust bearings are typically harder than both the material the pinions 114, 177 are made of and the material the collars 132 are made of. Thus, exclusion of the thrust washers 140 could wear and shorten the life of both the pinions 114, 117 and the clamps 132. The thrust washers 140 may be selected from material that is hard enough to withstand the pressure exerted on the washers 140 by the hardened rollers of the thrust bearings 138 so that the thrust washers 140 prevent the rollers of the bearings 138 from damaging the pinions 114, 117, the clutches 116, 119, and the collars 132.

Returning to FIG. 2, the apparatus 110 further includes an upper rack 142 and a lower rack 144. The upper rack 142 includes both a proximal end 146 and a distal end 148 and the lower rack 144 includes both a proximal end 150 and a distal end 152. The apparatus 110 further includes a pair of yokes 154, 164 that support and link 144. The yoke 154 has both a proximal end 156 and a distal end 158. A pair of spaced apart arms 160 are formed at the distal end 158 of the yoke 154. The spaced apart arms 160 are separated by a valley 162. Similarly, the yoke 164 has both a proximal end 166 and a distal end 168. A pair of spaced apart arms 170 are formed at the proximal end 166 of the yoke 164. The spaced apart arms 170 are separated by a valley 172.

The proximal end 146 of the rack 142 is attached to one of the arms 160 of the yoke 154 by rivets 173, and the proximal end 150 of the rack 144 is attached to the other of the arms 160 by rivets 173. Similarly, the distal end 148 of the rack 142 is attached to one of the arms 170 of the yoke 164 by rivets 173, and the distal end 152 of the rack 144 is attached to the other of the arms 160 by rivets 173. Any conventional fastening mechanism, such as nuts and bolts, or any conventional fastening technique, such as welding, may be substituted in place of the rivets 173 for fastening the racks 142, 144 to the yokes 154, 164. Alternatively, the racks 142, 144 may be integrally formed with the yokes 154, 164.

Figure 3:
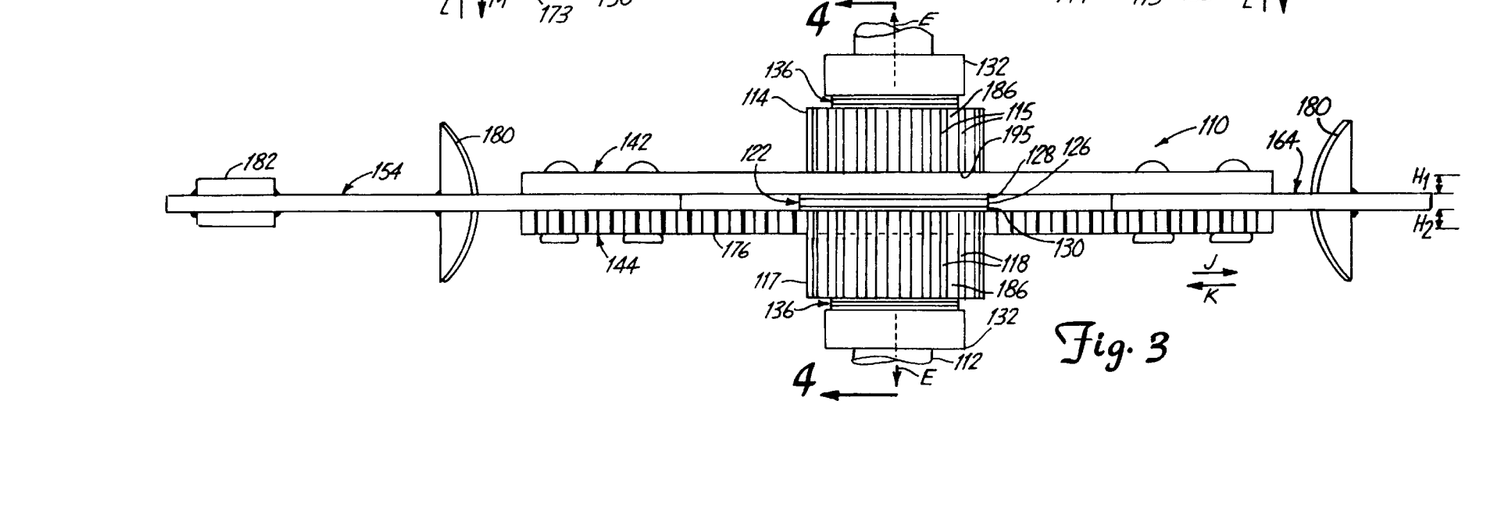
FIG. 3 is a top plan view of the device of the present invention for converting reciprocating motion to unidirectional rotational motion.

Rack 142 includes a plurality of teeth 174 that engage the teeth 115 of the pinion 114 (not shown in FIG. 2) and the rack 144 includes a plurality of teeth 176 that engage the teeth 118 of the pinion 117. As best depicted in FIG. 3, each tooth 174 of the rack 142 extends fully across a width $H_1$ of the rack 142, and each tooth 176 of the rack 144 extends fully across a width $H_2$ of the rack 144. Additionally, the teeth 174 are preferably equally spaced along the entire length of the rack 142 and the teeth 176 are preferably equally spaced along the entire length of the rack 144. Returning to FIG. 2, are spaced apart from each other by the same distance that the distal ends 148, 152 of the racks 142, 144 are spaced apart, after attachment of the racks 142, 144 to the yokes 154, 164, so that the teeth 174 of the rack 142 are parallel to the teeth 176 of the rack 144. Additionally, the arms 160 of the yoke 154 are spaced apart from each other by a distance $I_1$ and the arms 170 of the yoke 164 are spaced apart from each other by the distance $I_1$. The distance $I_1$ is greater than a diameter $I_2$ of the bearing mechanism 122 so that the bearing mechanism 122 is capable of fitting between the arms 160 and between the arms 170 and travel of the racks 142,144 is thereby maximized.

The teeth 115 of the pinion 114, the teeth 118 of the pinion 117, the teeth 174 of the rack 142, and the teeth 176 of the rack 144 may have any diametral pitch that permits the apparatus 110 to function in the manner described below to impart power to the shaft 112. However, the teeth 115 of the pinion 114, the teeth 118 of the pinion 117, the teeth 174 of the rack 142, and the teeth 176 of the rack 144 each preferably have a diametral pitch of about 10 to enhance the strength of the individual teeth.

Additionally, the apparatus 110 may be designed so that the teeth 174 of the rack 142 engage the teeth 115 of the pinion 114 at any pressure angle that permits the apparatus 110 to function in the manner described below to impart power to the shaft 112. Similarly, the teeth 176 of the rack 144 may engage the teeth 118 of the pinion 117 at any pressure angle that permits the apparatus 110 to function in the manner described below to impart power to the shaft 112. Nonetheless, the apparatus 110 is preferably designed so that the teeth 174 of the rack 142 engage the teeth 115 of the pinion 114 at a pressure angle of about 20 degrees. Similarly, the teeth 176 of the rack 144 preferably engage the teeth 118 of the pinion 117 at a pressure angle of about 20 degrees.

The diametral pitch of each pinion 114, 117 is defined as the ratio of the number of teeth in the pinion to the diameter of the pitch circle of the pinion that is measured in inches. *Standard Handbook for Mechanical Engineers*, page 8–32 (17th ed. 1967). The diameter of the pitch circle of each pinion is equal to (N py)/π, where N is the number of teeth in the pinion and where p is the linear measure in inches along the pitch circle between corresponding points of adjacent teeth in the pinion. Id. The pitch circle is defined as the imaginary circle of the pinion that rolls without slippage with the pitch circle of the mating teeth of each respective rack 114, 115. Id. The diametral pitch of the teeth 174, 176 of the racks 142, 144 is chosen to be the same as the diametral pitch of the teeth 115, 118 of the pinions 114, 117, respectively. Finally, the pressure angle of the mating teeth of the pinion and associated rack is defined as the acute angle between the common normal to the profiles at the contact point and the common pitch plane. Id. The details contained in the Gearing section of the *Standard Handbook for Mechanical Engineers*, pages 8–131 through 8–155 (McGraw-Hill, 17th ed. 1967), are hereby incorporated by reference.

The yokes 154, 164 each include a bumper support 178 that is formed of thin steel. The bumper support 178 of the yoke 154 is tack welded to the yoke 154 in the valley 162 between the arms 160 and the bumper support 178 of the yoke 164 is tack welded to the yoke 164 in the valley 172 between the arms 170. Polyurethane bumpers 180 are mounted to each of the bumper supports 178. Additionally, a bushing 182 is positioned in a bore 184 through the proximal end 156 of the yoke 154.

An actuator, such as a reciprocable arm (not shown), is attached to the proximal end 156 of the yoke 154 for actuating the apparatus 110, driving the rack 142 in a primary direction J, and driving rack 144 in a reciprocal direction K. The reciprocable arm may be pivotally attached to the yoke 154 using a pin (not shown) that is inserted through both a bore (not shown) of the arm and the bushing 182. The actuator, such as the reciprocable arm, may also be pivotally attached to the frame (not shown) that supports the shaft 112.

If the actuator, such as the reciprocable arm, is pivotally attached to the frame, reciprocating movement of the actuator to drive the rack 142 in the direction J and the rack 144 in the direction K will cause bushing 182 to follow an arcuate path. Along part of this arcuate path, the proximal ends 146, 150 of the racks 142, 144 may pitch upward in the direction of arrow L and the distal ends 148, 152 of the racks 142, 144 may pitch downward in the direction of arrow M. Also, during part of this arcuate path, the proximal ends 146, 150 of the racks 142, 144 may pitch downward in the direction of arrow M and the distal ends 148, 152 of the racks 142, 144 may pitch upward in the direction of arrow L.

As best depicted in FIG. 2, each adjacent pair of teeth 118 in the pinion 117 are separated by a valley 186. Though not depicted in FIG. 2, each adjacent pair of teeth 115 of the pinion 114 are similarly separated by a valley 186. Each valley 186 has a bottom 188 that is located closest to the axis E of the shaft 112. The pinion 114 is mounted directly onto the clutch 116 that is mounted on the shaft 112 (not shown in FIG. 2, and the pinion 117 is mounted directly onto the clutch 119 that is mounted on the shaft 112. The bottom 188 of each valley 186 of each pinion 114 is separated from the shaft 112 by a distance N that is measured along a line that extends through the bottom 188 and the axis E of the shaft 112.

As best depicted in FIG. 4, each centering ring 125 has both an inner radial surface 190 and an outer radial surface 192. The distance between the radial surfaces 190, 192 is approximately equal to the distance N that separates the bottom 188 of each valley 186 from the shaft 112. As noted previously, the inner radial surface 123 of the bearing mechanism 122 is in contact with and is supported by the outer radial surface 192 of the centering ring 125.

The purpose of the bearing mechanism 122 is to support, with creation of a minimum amount of friction, side loads imparted by the racks 142, 144 that arise from interaction of the teeth 174 of the rack 142 with the teeth 115 of the pinion 114 and from interaction of the teeth 176 of the rack 144 with the teeth 118 of the pinion 117. To this end, a surface 193 of the bearing mechanism 122 that faces the rack 142 should be capable of fully contacting side surfaces 194 of the teeth 174 and side surfaces 195 of the teeth 115 where the teeth 174 and the teeth 115 are in contact with each other. Similarly, a surface 196 of the bearing mechanism 122 that faces the rack 144 should be capable of fully contacting side surfaces 197 of the teeth 176 and side surfaces 198 of the teeth 118 where the teeth 176 and the teeth 118 are in contact with each other.

The distance N is selected as the approximate distance between the radial surfaces 190, 192 of the centering ring 125 to minimize unnecessary contact between the pinion 114 and the bearing mechanism 122 and between the pinion 117 and the bearing mechanism 122. Selection of the distance N as the approximate distance between the radial surfaces 190, 192 of the centering ring 125, also assures that the teeth 115 of the pinion 114 and the teeth 174 of the rack 142 that are in engagement with each other will be fully supported by the bearing mechanism 122 when any moment urges the rack 142 toward the bearing mechanism 122 and that the teeth 118 of the pinion 117 and the teeth 176 of the rack 144 will be fully supported by the bearing mechanism 122 when any moment urges the rack 144 toward the bearing mechanism 122.

Each tooth 115, 118 of each respective pinion 114, 117 has a height O. A distance P between the inner radial surface 123 and the outer radial surface 124 of the bearing mechanism 122 is equal to or greater than the distance O. Preferably, the dimension P of the bearing mechanism 122 is at least about 50% greater than the dimension O. This preferred size of the dimension O helps to spread out the forces exerted by the racks 142, 144 on the bearing mechanism 122, thereby predominantly negating any wear on surfaces of the bearing mechanism 122 and the rack 142 that are in contact with each other and on surfaces of the bearing mechanism 122 and the rack 144 that are in contact with each other.

In operation, the apparatus 110 for converting reciprocating motion to single direction rotational motion predominantly avoids the friction and wear problems exhibited by the prior art apparatus 10 depicted in prior art FIG. 1. Movement of the rack 142 in the primary direction J (the primary direction J points toward the reader in FIG. 4) creates a force acting in the direction of arrow Q that is equal to the rack 142 pressure times the tangent of the pressure angle at which the teeth 174 of the rack 142 meet the teeth 115 of the pinion 114. This force Q attempts to urge the teeth 174 out of engagement with the teeth 115 and further creates a moment that tries to rotate the rack 142 in the direction of arrow R and, since the racks 142 and 144 are rigidly attached to the yokes 154, 164, also attempts to rotate the rack 144 in the direction of arrow S.

However, as the rack 142 attempts to rotate in the direction of arrow R, the rack 142 encounters the bearing mechanism 122. The support of the thrust bearing 126 against the thrust washer 128 and the corresponding support of the thrust washer 128 against the rack 142 prevents the rack 142 from rotating in the direction of arrow R and thereby prevents the teeth 174 from coming out of engagement with the teeth 115. Correspondingly, the thrust bearing 126 supports the thrust washer 130 that is in contact with the rack 144 and prevents rotation of the rack 144 in the direction of arrow S.

Similarly, movement of the rack 144 in the reciprocal direction K (the reciprocal direction K points away from the reader in FIG. 4) creates a force acting in the direction of arrow T that is equal to the rack 144 pressure times the tangent of the pressure angle at which the teeth 176 of the rack 144 meet the teeth 118 of the pinion 117. This force T attempts to urge the teeth 176 out of engagement with the teeth 118 and further creates a moment that tries to rotate the rack 144 in the direction of arrow S and, since the racks 142 and 144 are rigidly attached to the yokes 154, 164, also attempts to rotate the rack 142 in the direction of arrow R.

However, as the rack 144 attempts to rotate in the direction of arrow S, the rack 144 encounters the bearing mechanism 122. The support of the thrust bearing 126 against the thrust washer 130 and the corresponding support of the thrust washer 130 against the rack 144 prevents the rack 144 from rotating in the direction of arrow S and thereby prevents the teeth 176 from coming out of engagement with the teeth 118. Correspondingly, the thrust bearing 126 supports the thrust washer 128 that is in contact with the rack 142 and prevents rotation of the rack 142 in the direction of arrow R.

In operation, the bearing mechanism 122 thus serves a number of different roles. For example, the mechanism 122 counterbalances separating force generated between the teeth 174 of the rack 142 and the teeth 115 of the pinion 114 and thereby retains the teeth 174 of the rack 142 in engagement with the teeth 115 of the pinion 114. Similarly, the mechanism 122 counterbalances separating force generated between the teeth 176 of the rack 144 and the teeth 118 of the pinion 117 and thereby retains the teeth 176 of the rack 144 in engagement with the teeth 118 of the pinion 117. Additionally, by counterbalancing the separating force generated between the teeth 174 and the teeth 115 and between the teeth 176 and the teeth 118, the mechanism 122 prevents rotation of the racks 142, 144 with respect to the axis E of the shaft 112.

The thrust washers 128, 130 are free to independently roll about the axis E of the shaft 112 due to the contact between the washer 128 and the bearing 126 and between the washer 130 and the bearing 126. Therefore, there is no relative motion between the pinion 114 and the washer 128 that is in contact with the pinion 114 and there is no relative motion between the pinion 117 and the washer 130 that is in contact with the pinion 117 when the racks 142, 144 are moved in either the primary direction J or the reciprocal direction K and the pinions thereby rotate about the E axis of the shaft 112.

Additionally, since the racks 142, 144 move at the same speed in the primary direction J and in the reciprocal direction K and since the thrust washers 128, 130 are free to independently roll about the axis E of the shaft 112, the only relative motion between the rack 142 and the washer 128 that is in contact with the rack 142 is the rolling motion of the washer 128 against the rack 142 and the only relative motion between the rack 144 and the washer 130 that is in contact with the rack 144 is the rolling motion of the washer 130 against the rack 144, as the racks 142, 144 are advanced in either the primary direction J or the reciprocal direction K. As explained below, the coefficient of friction due to this relative rolling motion of the washer 128 against the rack 142 and due to this rolling motion of the washer 130 against the rack 144 is only a small percentage of the coefficient of friction due to the rubbing of the yoke 20against the pinions 12, 13in the prior art apparatus 10 that is depicted in prior art FIG. 1. The small amount of friction and potential wear resulting from this rolling of the washer 128 against the rack 142 and this rolling motion of the washer 130 against the rack 144 is predominantly negated by applying a conventional lubricant, such as a commercially available lubricating grease, between the washer 128 and the rack 142 and between the washer 130 and the rack 144.

As noted, the rack 142 that is in contact with the washer 128 pivots slightly in the direction of arrow L or arrow M (not shown in FIG. 4) as the actuator or reciprocable arm advances the rack 142 in the primary direction J or the reciprocal direction K and guides the bushing 182 (not shown in FIG. 4) of the yoke 154 along the previously noted arcuate path. Similarly, the rack 144 that is in contact with the washer 130 pivots slightly in the direction of arrow L or arrow M as the actuator or reciprocable arm advances the rack 144 in the primary direction J or the reciprocal direction K and guides the bushing 182 of the yoke 154 along the previously noted arcuate path. There is no relative motion between the rack 142 and the washer 128 that is in contact with the rack 142 due to pivoting of the rack 142 in the direction of either arrow L or arrow M, since the pivoting motion of the rack 142 in the direction of arrow L or arrow M, like the rotating motion of the washer 128, is centered about the axis E of the shaft 112. Similarly, there is no relative motion between the rack 144 and the washer 130 that is in contact with the rack 144 due to pivoting of the rack 144 in the direction of either arrow L or arrow M, since the pivoting motion of the rack 144 in the direction of arrow L or arrow M, like the rotating motion of the washer 130, is centered about the axis E of the shaft 112.

The benefit of the apparatus 110 over the prior art apparatus 10 of prior art FIG. 1 is that the rolling motion of the washer 128 against the rack 142 and the rolling motion of the washer 130 against the rack 144 as the racks 142, 144 are moved in either the primary direction J or the reciprocal direction K exhibits a sliding coefficient friction on the order of about 0.003 to about 0.004, whereas the sliding coefficient of friction due to sliding of the prior art yoke 20 against the pinions 12, 13 of the prior art apparatus 10 exhibits a sliding coefficient of friction on the order of about 0.06 to as much as about 0.13. Thus, the friction exhibited during operation of the apparatus 110, and the potential for wear, is reduced by a factor of approximately 20 to approximately 30, as compared to the amount of friction existent during operation of prior art apparatus 10.

The pinions 114, 117 may be made of any suitable rigid, hard material, such as metal, including carbon steel and steel alloys. Preferably, the pinions 114, 117 are of medium-high strength carbon steel. Preferably, the material used to make the pinions 114, 117, has a higher strength than the material that is used to make the racks 142, 144. The one-way clutches 116, 119 may be any suitable one-way clutch made of any suitable materials, such as metals, plastics, and combinations of metals and plastics. As one example, the clutches 114, 119 may each be Torrington Model RCB-162117-FS one-way clutches obtained from Torrington Company of Torrington, Connecticut. The centering ring 125 may be made of any suitable metal or rigid plastic material having a low friction surface. As an example, the centering ring 125 may be made of NYLON synthetic polyamide, such as MD NYLON synthetic polyamide. MD NYLON synthetic polyamide is NYLON synthetic polyamide that incorporates molybdenum disulfide.

The shaft 112 may be made of any rigid metal having a hardened surface. As one example, the shaft may be a 1" diameter carbon steel shaft with a surface hardness of 58 on the Rockwell C scale. The clamp collars 132 may be made of any suitable metal. One example of the clamp collars 132 is a clamp collars that is clamped in place on the shaft 112 by set screws that extend from the clamp collar.

Both the racks 142, 144 and the yokes 154, 164 are made of any suitable rigid, hard material, such as metal. Preferably, the racks 142, 144 and the yokes 154, 164 are made of carbon or alloy steel. As already mentioned, the teeth 115 of the pinion 114 and the teeth 174 of the rack 142 preferably meet at a 20 degree pressure angle and preferably each have a diametral pitch of about 10. Likewise, the teeth 118 of the pinion 117 and the teeth 176 of the rack 144 preferably meet at a 20 degree pressure angle and preferably each have a diametral pitch of about 10.

The bearing mechanism 122 may take the form of any low friction mechanism that can be mounted onto or about the shaft 112, is capable of preventing the rack 142 from rotating in the direction of arrow R, is capable of preventing the rack 144 from rotating in the direction of arrow S, and is thereby capable of preventing the teeth 174 from coming out of engagement with the teeth 115 and is capable of preventing the teeth 176 from coming out of engagement with the teeth 118. For example, the bearing mechanism 122 may take the form of one or more conventional low friction, plastic thrust washers. Preferably, however, the combination of the thrust bearing 126 and the thrust washers 128, 130 is used since this structure of the bearing mechanism 122 produces somewhat less friction due to contact with the racks 142, 144 and the pinions 114, 117 than the plastic thrust washer would. However, economics may enter into this decision since the plastic thrust washers are significantly less expensive than the thrust washer 128, 130 and thrust bearing 126 structure.

When the thrust bearing 126 is used in the bearing mechanism 122, the thrust washers 128, 130 may be any suitably hard plastic or metal, though the thrust washers 128, 130 are preferably metal washers that have a surface hardness of about 58 on the Rockwell C scale. The thrust bearing 126 may be any conventional type of roller thrust bearing, such as a tapered roller thrust bearing of the Timkin-type or a needle-type roller thrust bearing. In one preferred embodiment, the thrust bearing 126 is a Torrington model NTA-2840 needle-type roller thrust bearing that may be obtained from Torrington Company and the thrust washers 128, 130 are Torrington model TRB-2840 thrust washers that may also be obtained from Torrington Company. Whatever form the bearing mechanism 122 takes, the thickness of the bearing mechanism 122 measured along a line parallel to the axis E of the shaft 112 is preferably minimized to minimize the magnitude of the moments acting in directions R and S, and thereby further help minimize the frictional forces arising from the rolling motion of the washers 128, 130 against the racks 142, 144, respectively. Additionally, the yokes 154, 156 should each have a thickness measured along a line parallel to the axis E that is equal to, or up to about one percent greater than, the thickness of the bearing mechanism 122 measured along a line parallel to the axis E of the shaft 112 to so that the racks 142, 144 do not pre-load the bearing mechanism 122 prior to movement of the racks 142, 144 in the primary direction J or the reciprocal direction K.

In the bearing mechanism 122, it is possible to exclude the thrust washers 128, 130 so that the thrust bearing 126 rides directly against the racks 142, 144, and the pinions 114, 117. However, it is preferable to include the thrust washers 128, 130 on opposing sides of the thrust bearing 126. The reason for this preference is that the rollers within the thrust bearing are typically harder than both the material of the pinions 114, 117 and the material of the racks 142, 144. Thus, exclusion of the thrust washers 128, 130 could wear and shorten the life of both the pinions 114, 117 and the racks 142, 144. The thrust washers 128, 130 may be selected from any material that is hard enough to withstand the pressure exerted on the washers 128, 130 by the hardened rollers of the thrust bearing 126 so that the thrust washers 128, 130 shield the pinions 114, 117 and the racks 142, 144 from damage by the rollers of the bearing 126.

The bearing mechanisms 136 may take the form of any low friction mechanism that can be mounted onto the shaft 112 and is capable of reducing friction losses due to rotation of the pinion 114 relative to the collar 132 and due to rotation of the pinion 117 relative to the collar 132. For example, the bearing mechanisms 136 may each take the form of one or more low friction, plastic thrust washers. Preferably, however, the combination of the thrust bearing 138 and the thrust washers 140 is used since this structure of the bearing mechanism 136 produces somewhat less friction due to contact between bearing mechanism 136 and the collars 132 than a plastic thrust washer would. However, economics may enter into this decision since the plastic thrust washers are significantly less expensive than the thrust washer 140 and thrust bearing 138 structure.

When the thrust bearing 138 is used in the bearing mechanism 136, the thrust washers 140 may be any suitably hard plastic or metal, though the thrust washers 140 are preferably metal washers that have a surface hardness of about 58 on the Rockwell C scale. The thrust bearing 138 may be any conventional type of roller thrust bearing, such as a tapered roller thrust bearing of the Timkin-type or a needle-type roller thrust bearing. In one preferred embodiment, the thrust bearing 138 is a Torrington model NTA-1625 needle-type roller thrust bearing that may be obtained from Torrington Company and the thrust washers 140 are Torrington model TRA-1625 thrust washers that may also be obtained from Torrington Company.

Figure 5:
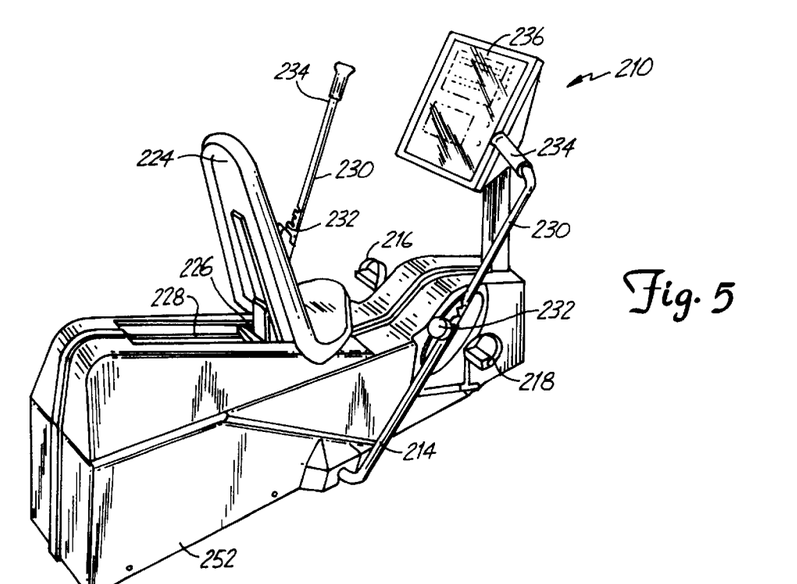
FIG. 5 is a perspective view of an exercise machine of the present invention that incorporates the device of the present invention for converting reciprocating motion to single direction rotational motion.
Figure 6:
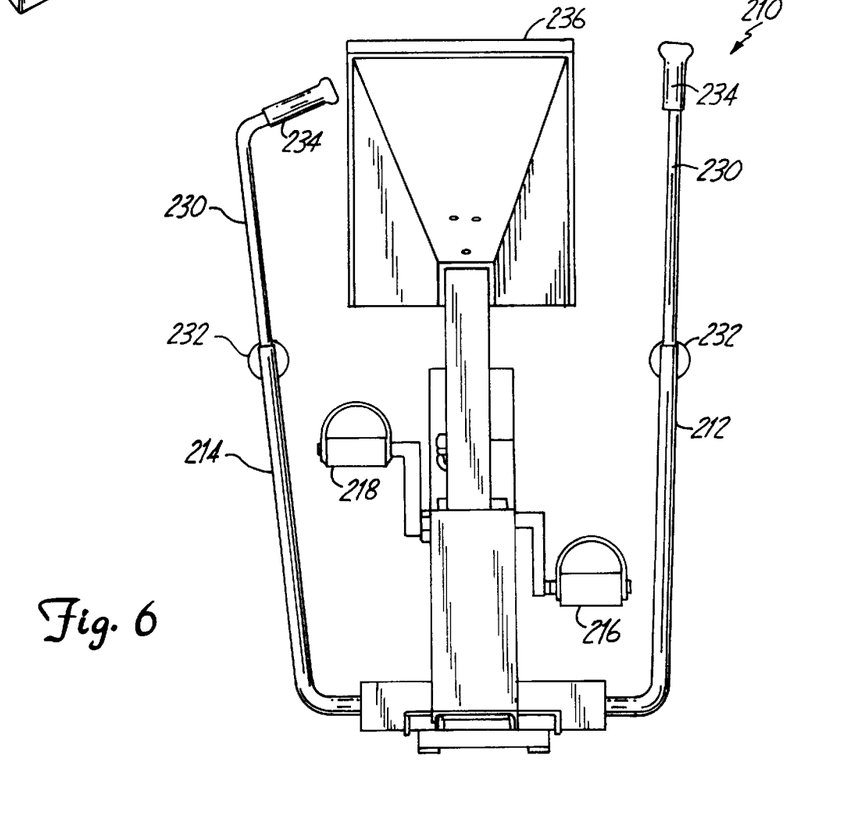
FIG. 6 is a front plan view of the exercise machine of the present invention that incorporates the device of the present invention for converting reciprocating motion to single direction rotational motion.
Figure 7:
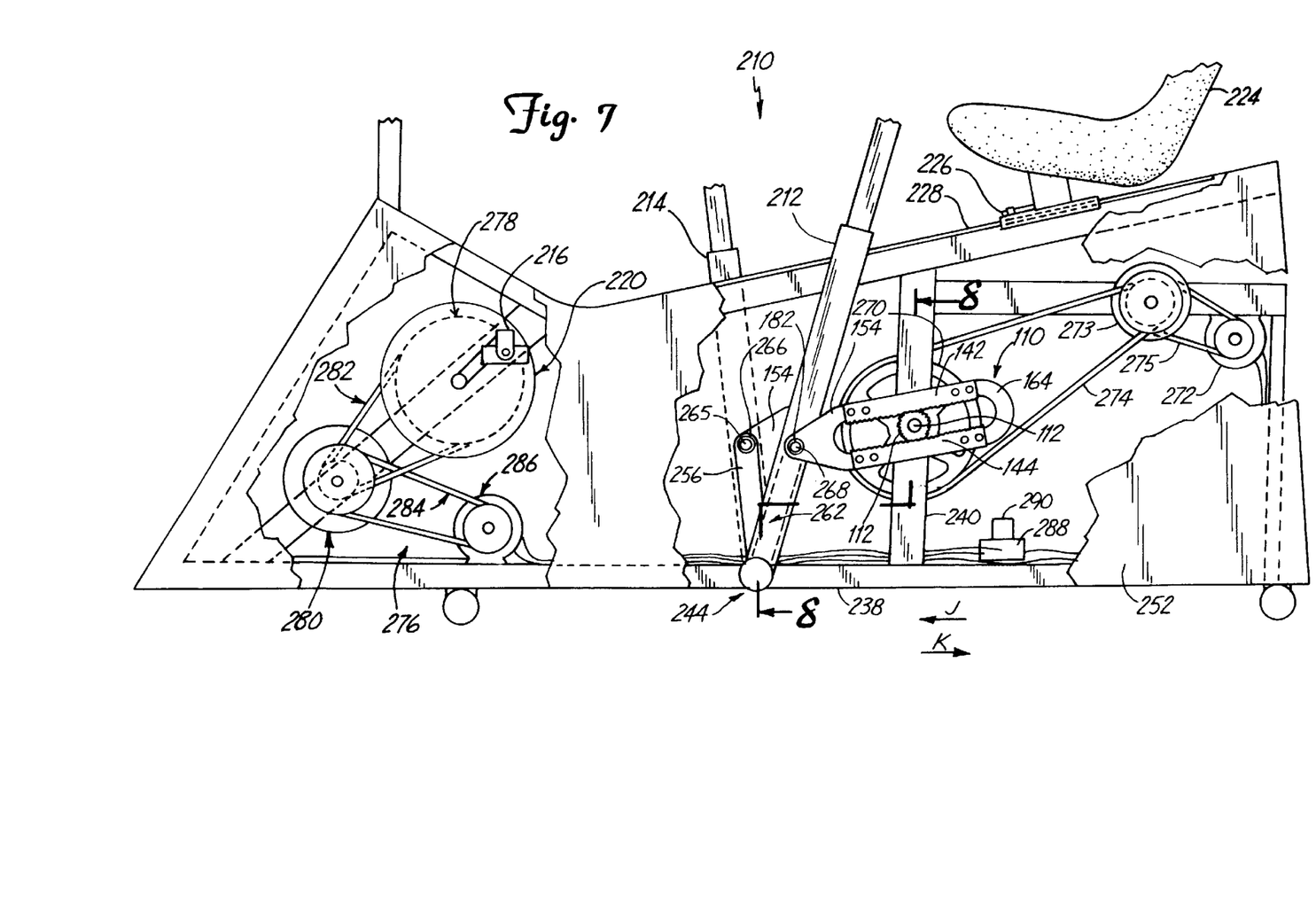
FIG. 7 is a side plan view of the exercise machine of the present invention that incorporates the device of the present invention for converting reciprocating motion to single direction rotational motion.

An exercise machine of the present invention that incorporates a pair of the apparatuses 110 for converting reciprocating motion to single direction rotational motion is generally depicted at 210 in FIG. 5. The exercise machine 210 provides both upper and lower body exercise capabilities. The upper body exercise is a reciprocating arm exercise provided by exercise arms 212, 214 that are individually coupled to the two apparatuses 110 of the machine 210. The lower body exercise is a cycling type exercise provided by pedals 216, 218 that are individual attached to opposing sides of a crank set 220, as best depicted in FIG. 7, that is rotatably mounted within the machine 210.

The machine 210 includes an adjustable recumbent seat 224 with an attached plate 226 that is mounted on a positioning track 228 and allows a person to adjust his position relative to the arms 212, 214 and the pedals 216, 218. The seat 224 supports the user's body weight over a range of positions and facilitates mounting and dismounting the machine 210. The seat 224 may be positioned with respect to pedals 216, 218 to enhance pedaling efficiency and comfort as part of the cycling exercise. This allows the long-legged user to adjust the seat position and maintain a desired hip posture and body angle relative to the cycling action. A user who is seated on the seat 224 may move either the arm 212 or the arm 214 in reciprocating fashion or both of the arms 212, 214 in reciprocating fashion.

The exercise arms 212, 214 are disposed on opposing sides of the machine 210. The seat 224 may be positioned substantially adjacent the arms 212, 214. The arms 212, 214 each include an arm extension 230 that may be adjusted in using an adjustment knob 232. Hand grips 234 are also provided on the arms 212, 214 at the upper end of the extensions 230 for gripping of the arms 212, 214. The hand grips 234 may be rotated from positions at right angles to the arms 212, 214 to positions in-line with the arms 212, 214. Rotation of the grips 234 to these different orientations permits exercise of different muscle groups.

The machine 210 includes a display and control panel 236 for easy access and viewing by the seated user. User display and control panel 236 displays current exercise intensity level, proportion of a desired intensity level that is being attained, distribution of body effort between the lower body and the upper body, terrain profile of the cycle exercise for the lower body, estimated calories expended, and other information of interest to the user. The panel 236 also permits adjustment of the exercise program through controls that are included on the panel 236. For example, the resistance to movement of the arms 212, 214, and the resistance encountered via the pedals 216, 218 may be independently adjusted.

Figure 8:
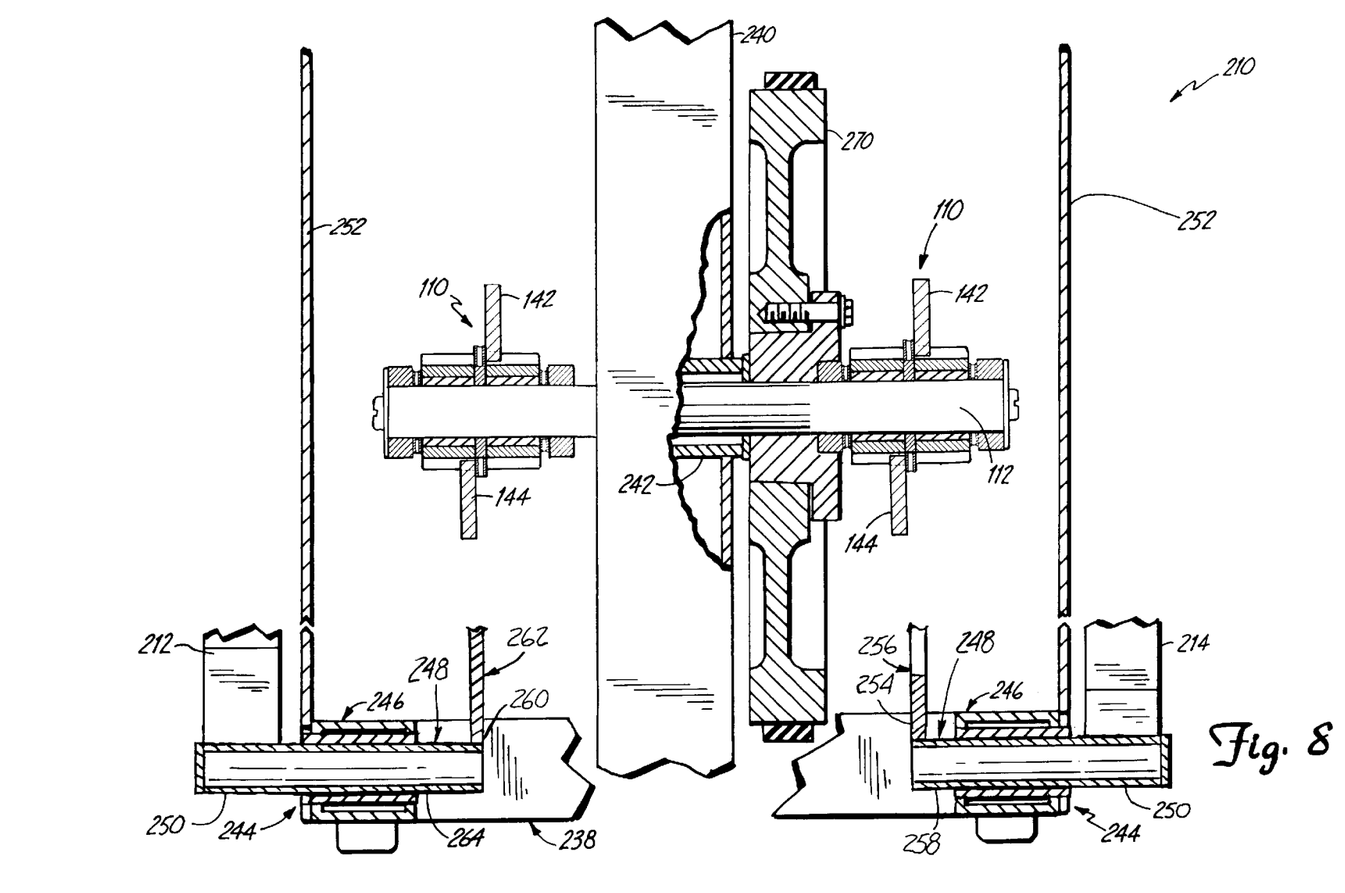
FIG. 8 is a sectional view taken along line 8—8 of FIG. 7.

As best depicted in FIG. 7, the exercise machine 210 includes a frame 238 with a vertical pillar 240. A sleeve or bushing 242 (not shown in FIG. 7) extends through the pillar 240 and rotatably supports the shaft 112 on which each apparatus 110 is mounted. As best depicted in FIG. 8, the machine 210 includes a pair of fulcrums 244. Each fulcrum 244 comprises a sleeve bearing 246 that is mounted in the frame 238 along with a shaft 248 that extends through the sleeve bearing 246. The exercise arms 212, 214 are fixedly attached to a distal end 250 of the respective shafts 248. An exterior shell 252 envelopes and is attached to exterior surfaces of the frame 238. The arms 212, 214 are fixedly attached to the shafts 248 outside of the exterior shell 252.

The shafts 248 extend from the sleeve bearings 246 into the interior of the frame 238. A distal end 254 of an arm 256 is fixedly attached to a proximal end 258 of one of the shafts 248. Likewise, a distal end 260 of another arm 262 is attached to a proximal end 264 of the other shaft 248. As best depicted in FIG. 7, the arm 256 is pivotally attached to the yoke 154 of one of the apparatuses 110 by a pin 265 that extends through a bushing 266 within the arm 256 and through the bushing 182 (not shown in FIG. 7) of the apparatus 110. The arm 262 is similarly attached pivotally to the other apparatus 110 by a pin 268 that extends through a bushing (not shown) within the arm 262 and through the bushing 182 of the other apparatus 110.

A sprocket 270 is rigidly mounted onto the shaft 112 of the exercise machine 210 between the vertical pillar 240 and one of the apparatuses 110. Rotation of the shaft 112 causes the sprocket 270 to rotate in the same direction and at the same speed as the shaft 112, since the sprocket 270 is rigidly mounted on the shaft 112. The machine 210 also includes a DC generator 272 that is mounted within the frame 238 and is coupled with the sprocket 270 via an intermediate gear 273, drive belt 274 that engages both the sprocket 270 and the intermediate gear 273, and drive belt 275 that engages both the intermediate gear 273 and the DC generator 272. With this arrangement, reciprocating motion of the racks 142, 144 in the respective primary direction J and the reciprocal direction K is capable of driving the shaft 112, the sprocket 270, and the DC generator 272 which thereby produces direct current electric power.

When upper body exercise is desired, the user may grasp and move the arm 212 to alternately move the rack 142 and the rack 144 of the apparatus 110 that is attached to the arm 212 in the primary direction J and in the reciprocal direction K. When the rack 142 is moved in the direction J at a rate of speed sufficiently fast to overtake the shaft 112, the pinion 114 that is engaged to the rack 142 and is mounted on the one-way clutch 116 causes the one-way clutch 116 to engage the shaft 112 and accelerate the shaft 112. During this application of power from the rack 142 to the shaft 112, the one-way clutch 119 that is attached to the pinion 117 freewheels relative to the shaft 112 and therefore does not apply any power to the shaft 112. When the rack 144 is moved in the reciprocal direction K at a rate of speed sufficiently fast to overtake the shaft 112, the pinion 117 that is engaged to the rack 144 and is mounted on the one-way clutch 119 causes the one-way clutch 119 to engage the shaft 112 and accelerate the shaft 112. During this application of power from the rack 144 to the shaft 112, the one-way clutch 116 that is attached to the pinion 114 freewheels relative to the shaft 112 and therefore does not apply any power to the shaft 112.

Similarly, the user may simultaneously or separately grasp and move the arm 214 to alternately move the rack 142 and the rack 144 of the other apparatus 110 that is attached to the arm 214 in the primary direction J and in the reciprocal direction K. Using either or both of the arms 212, 214, the user may thereby apply power to the shaft 112 to increase the rotational speed of the shaft 112. Since the sprocket 270 is fixedly attached to the shaft 112, the power transmitted to the shaft by movement of the arms 212, 214 also drives the DC generator 272 to produce direct current electricity.

The exercise machine 210 may also include a cycling drive train 276. The cycling drive train 276 includes the pedals 216, 218 that are mounted on the crank set 278. The crank set 278 guides the user's feet that are positioned on the pedals 216, 218 in a rotational direction to simulate bicycling. The cycling drive train 276 is fitted with an intermediate set of reduction pulleys or gears 280 that are linked to the crank set 278 by a chain or belt 282. The reduction pulleys or gears 280 are sequentially linked by a belt or chain 284 to an alternator 286 that is mounted within the frame 238. Movement of the cycling drive train 276 via the action of the user's feet on the pedals 216, 218 drives the alternator 286 and thereby produces alternating current electric power.

The exercise machine additionally includes both a variable resistor pack 288 and a heat sink 290 that are mounted within the frame 238. The DC generator 272 and the alternator 286 are each electronically connected to the resistor pack 288. As explained more fully below, the variable resistor pack 288 may be used to apply selective loads to the generators 272 and the alternator 286, and thereby adjust the resistance encountered by the user when moving the arms 212, 214, and the pedals 216, 218.

Figure 9:
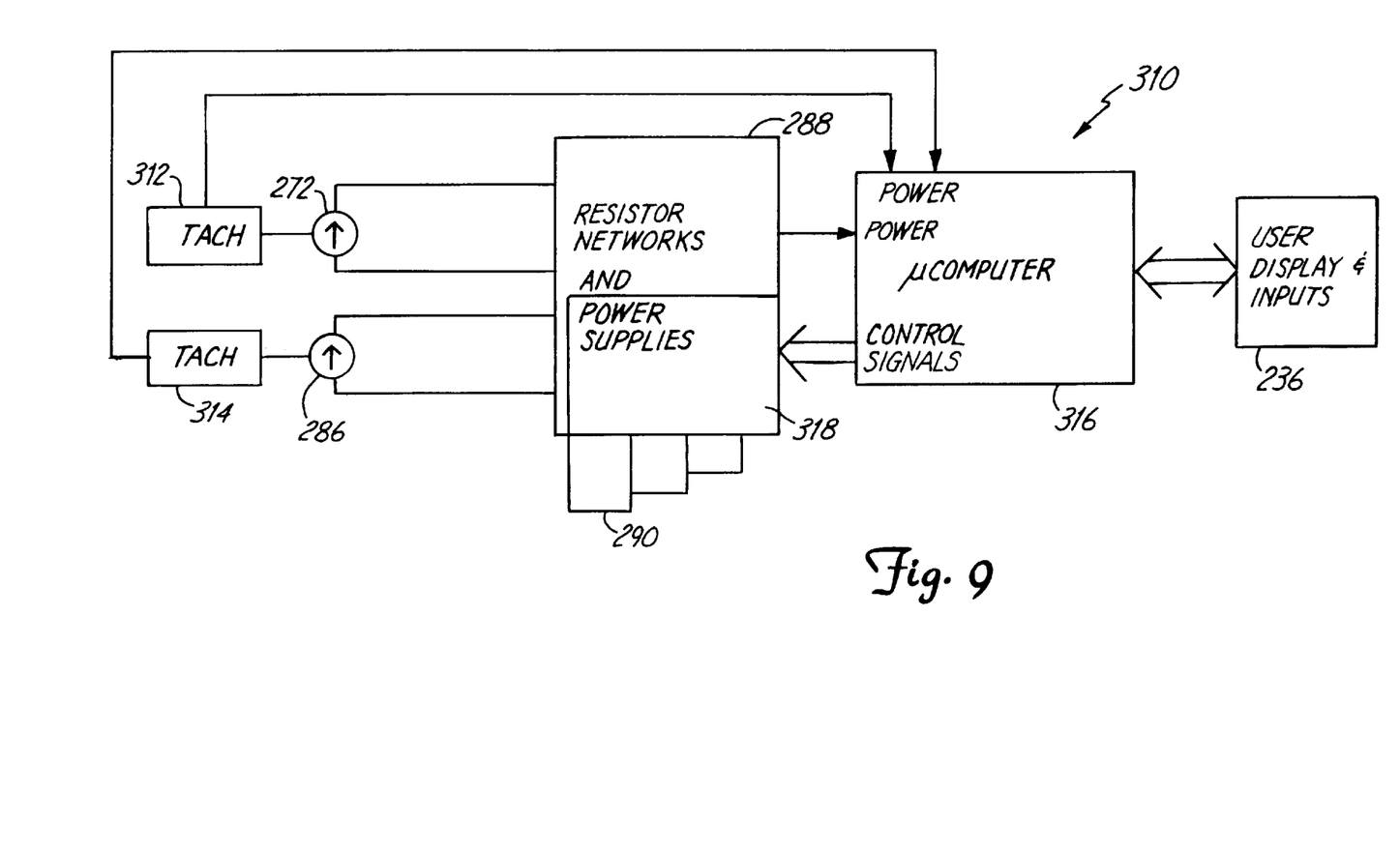
FIG. 9 is a schematic of control and load circuitry associated with the exercise machine of the present invention that incorporates the device of the present invention for converting reciprocating motion to single direction rotational motion.

An electrical system that may be incorporated in the exercise machine is generally depicted at 310 in FIG. 9. The DC generator 272 and the alternator 286 are coupled to tachometers 312, 314, respectively. Measurements at the tachometers 312, 314 are transmitted to a microcomputer 316 that is housed in the display and control panel 236 of the exercise machine 210 (not shown in FIG. 9). The DC generator 272 and the alternator 286 are connected across the variable resistor pack 288 which applies selected loads independently to the generator 272 and the alternator 286 at the direction of the microcomputer 316. Heat produced in the variable resistor pack 288 is dissipated through the heat sink 290.

The microcomputer 316 provides control signals to the variable resistor pack 288 to vary the instantaneous resistance shown in the generator 272 and the alternator 286. Resistance may be varied using resistance controllers (not shown) mounted in the display and control panel 236 to set the total load and variability of the load and thereby provide simulated terrain profiling. The microcomputer 316 is also coupled to the generator 272 through a power supply 318 so that the microcomputer 316 derives all power for its operation from the generator 272. This eliminates the need for a battery within the exercise machine 210 and also eliminates any need to connect the exercise machine 210 to an external power supply. The microcomputer 316 also drives the display and control panel 236 and receives control inputs from the display and control panel 236 to determine the program the microcomputer 316 will operate and the parameters of the program.

Although the present invention has been described with reference to preferred embodiments, workers skilled in the art will recognize that changes may be made in form and detail without departing from the spirit and scope of the invention.

What is claimed is:

1. An apparatus for converting reciprocating motion to single direction rotational motion, the apparatus comprising:
   a frame;
   a shaft supported by the frame for rotation relative to the frame;
   a first one-way clutch mounted on the shaft;
   a first pinion mounted on the first one-way clutch;
   a second one-way clutch mounted on the shaft;
   a second pinion mounted on the second one-way clutch;
   a first bearing mechanism mounted on the shaft between the first pinion and the second pinion;
   a first rack engaging the first pinion for driving the shaft when the first rack is moved in a primary direction at a rate of speed sufficiently fast to overtake the shaft;
   a second rack engaging the second pinion for driving the shaft when the second rack is moved in a reciprocal direction at a rate of speed sufficiently fast to overtake the shaft; and
   an actuator in working relation with the first rack and the second rack.

2. The apparatus of claim 1 wherein the first bearing mechanism comprises a roller thrust bearing.

3. The apparatus of claim 1 wherein the first bearing mechanism comprises a thrust washer.

4. The apparatus of claim 3 wherein the thrust washer is positioned in contact with the first pinion and the first rack, the thrust washer free of contact with both the first one-way clutch and the second one-way clutch.

5. The apparatus of claim 3 wherein there is no relative motion between the thrust washer and the first pinion.

6. The apparatus of claim 1 wherein the actuator comprises a reciprocable arm that is pivotally mounted to the frame.

7. The apparatus of claim 6, the apparatus further comprising a yoke that is attached to both the first rack and the second rack, the yoke attached to the reciprocable arm.

8. The apparatus of claim 7 wherein the first rack and the second rack are located on opposing outer sides of the yoke.

9. The apparatus of claim 1, the apparatus further comprising:
   a first clamping mechanism mounted on the shaft;
   a second clamping mechanism mounted on the shaft;
   wherein the first one-way clutch and the second one-way clutch are each located between the first clamping mechanism and the second clamping mechanism; and
   wherein the first clamping mechanism and the second clamping mechanism cooperatively fix the position of the first one-way clutch, the second one-way clutch, and the first bearing mechanism relative to a longitudinal axis of the shaft.

10. The apparatus of claim 9, the apparatus further comprising:
    a second bearing mechanism mounted on the shaft between the first one-way clutch and the first clamping mechanism, the second bearing mechanism effective to reduce friction between the first clamping mechanism and the first one-way clutch; and
    a third bearing mechanism mounted on the shaft between the second one-way clutch and the second clamping mechanism, the third bearing mechanism effective to reduce friction between the second clamping mechanism and the second one-way clutch.

11. The apparatus of claim 1 wherein the first bearing mechanism is in contact with at least the first rack or the second rack.

12. An exercise machine, the exercise machine comprising the apparatus of claim 1.

13. The apparatus of claim 1 wherein the first rack and the second rack are both movable relative to the first bearing mechanism.

14. The apparatus of claim 1, the apparatus further comprising a centering ring disposed between the shaft and the first bearing mechanism.

15. The apparatus of claim 14 wherein the centering ring is free of any contact with the first pinion, the first one-way clutch, the second pinion, and the second one-way clutch.

16. The apparatus of claim 14 wherein the centering ring is located in contact with the shaft, the centering ring rotatable with respect to the shaft.

17. The apparatus of claim 14 wherein the first bearing mechanism comprises a roller thrust bearing, the roller thrust bearing mounted on the centering ring.

18. The apparatus of claim 1 wherein the first bearing mechanism is located adjacent to the shaft, the first bearing mechanism rotatable with respect to the shaft.

19. The apparatus of claim 1 wherein the first bearing mechanism is located in contact with the shaft, the first bearing mechanism rotatable with respect to the shaft.

20. The apparatus of claim 1 wherein the first bearing mechanism comprises:
    a roller thrust bearing having a first side and a second side, the first side and the second side located on opposing sides of the roller thrust bearing; and
    a first thrust washer, the first thrust washer located in contact with the first side of the roller thrust bearing.

21. The apparatus of claim 20 wherein the first bearing mechanism further comprises:
    a second thrust washer, the second thrust washer located in contact with the second side of the roller thrust bearing, the first thrust washer separated from the second thrust washer by the roller thrust bearing.

22. An apparatus for converting reciprocating motion to single direction rotational motion, the apparatus comprising:
    a frame;
    a shaft supported by the frame for rotation relative to the frame;
    a first one-way clutch mounted on the shaft;
    a first plurality of gear teeth mounted about the first one-way clutch;
    a second one-way clutch mounted on the shaft;
    a second plurality of gear teeth mounted about the second one-way clutch;
    a first rack engaging the first plurality of gear teeth for driving the shaft when moved in a primary direction at a rate of speed sufficiently fast to overtake the shaft;
    a second rack engaging the second plurality of gear teeth for driving the shaft when moved in a reciprocal direction at a rate of speed sufficiently fast to overtake the shaft;
    an actuator in working relation with the racks; and
    a mechanism mounted between the first plurality of gear teeth and the second plurality of gear teeth, the mechanism counterbalancing separating forces generated between the first rack and the first plurality of gear teeth and between the second rack and the second plurality of gear teeth, while substantially eliminating frictional forces between the mechanism and the first rack and between the mechanism and the second rack.

23. The apparatus of claim 22, wherein:
    the mechanism comprises a bearing; and the first rack and the second rack are both movable relative to the bearing.

24. The apparatus of claim 22 wherein:
the mechanism comprises a bearing; and
the first rack and the second rack are in sliding contact with the bearing.

25. An exercise machine, the exercise machine comprising the apparatus of claim 22.

26. The apparatus of claim 22 wherein the mechanism is located adjacent to and in contact with the shaft, the mechanism rotatable with respect to the shaft.

27. The apparatus of claim 22 wherein the mechanism comprises a roller thrust bearing.

28. The apparatus of claim 27 wherein the mechanism further comprises a thrust washer, the thrust washer in contact with the roller thrust bearing.

29. The apparatus of claim 22 wherein the mechanism comprises a thrust washer mounted in contact with the first plurality of gear teeth and the first rack, the thrust washer free of contact with both the first one-way clutch and the second one-way clutch.

30. The apparatus of claim 22 wherein there is no relative motion between the thrust washer and the first plurality of gear teeth.

31. A method of converting reciprocating motion to single direction rotational motion, the method comprising:
rotatably mounting a shaft to a frame;
mounting a first one-way clutch and a second one-way clutch on the shaft;
mounting a first pinion on the first one-way clutch and a second pinion on the second one-way clutch;
mounting a bearing mechanism on the shaft between the first pinion and the second pinion;
engaging the first pinion with a first rack;
engaging the second pinion with a second rack; and
alternatively moving the first rack in a primary direction at a rate of speed sufficiently fast to overtake the shaft and the second rack in a reciprocal direction at a rate of speed sufficiently fast to overtake the shaft.

32. The method of claim 31, the method further comprising moving both the first rack and the second rack relative to the bearing mechanism.

33. The method of claim 31, the method further comprising positioning a spacing ring between the shaft and the bearing mechanism.

34. The method of claim 33 wherein the spacing ring is free of any contact with the first pinion, the first one-way clutch, the second pinion, and the second one-way clutch.

35. The method of claim 33 wherein the spacing ring is located in contact with the shaft, the spacing ring rotatable with respect to the shaft.

36. The method of claim 33 wherein the bearing mechanism comprises a roller thrust bearing, the roller thrust bearing mounted on the spacing ring.

37. The method of claim 31, the method further comprising placing the bearing mechanism in contact with at least the first rack or the second rack.

38. The method of claim 31, the method further comprising placing a yoke in working relation with the first lack and the second rack.

39. The method of claim 38, the method further comprising locating the first rack and the second rack on opposing sides of the yoke.

40. The method of claim 31, the method further comprising mounting the bearing mechanism in contact with the shaft, the bearing mechanism rotatable with respect to the shaft.

41. The method of claim 40 wherein the bearing mechanism comprises:
a roller thrust bearing; and
a thrust washer, the thrust washer located in contact with the roller thrust bearing.

42. The method of claim 31 wherein the mechanism comprises a thrust washer.

43. The method of claim 42 wherein the thrust washer is positioned in contact with the first pinion and the first rack, the thrust washer free of contact with both the first one-way clutch and the second one-way clutch.

44. The method of claim 42 wherein there is no relative motion between the thrust washer and the first pinion.

45. A method for converting reciprocating motion to single direction rotational motion, the method comprising:
supporting a shaft in a frame for rotation of the shaft relative to the frame;
mounting a first one-way clutch and a second one-way clutch on the shaft;
mounting a first plurality of teeth on the first one-way clutch and a second plurality of teeth on the second one-way clutch;
mounting a first rack in engagement with the first plurality of gear teeth for driving the shaft when the first rack is moved in a primary direction at a rate of speed sufficiently fast to overtake the shaft;
mounting a second rack in engagement with the second plurality of gear teeth for driving the shaft when the second rack is moved in a reciprocal direction at a rate of speed sufficiently fast to overtake the shaft; and
mounting a mechanism between the first rack and the second rack for counterbalancing separating forces generated between the first rack and the first plurality of gear teeth and between the second rack and the second plurality of gear teeth, while predominantly eliminating frictional forces between the mechanism and the first rack and between the mechanism and the second rack.

46. The method of claim 45 wherein:
the mechanism comprises a bearing; and
the first rack and the second rack are both movable relative to the bearing.

47. A method for converting reciprocating motion to single direction rotational motion, the method comprising:
mounting a shaft in a frame for rotation of the shaft relative to the frame, the shaft having a longitudinal axis;
mounting a first one-way clutch and a second one-way clutch on the shaft;
mounting a first rack for engaging the first one-way clutch and driving the shaft when the first rack is moved in a primary direction at a rate of speed sufficiently fast to overtake the shaft;
mounting a second rack for engaging the second one-way clutch and driving the shaft when the second rack is moved in a reciprocal direction at a rate of speed sufficiently fast to overtake the shaft; and
positioning a bearing mechanism between the first rack and the second rack to prevent the first rack and the second rack from rotating with respect to the longitudinal axis of the shaft.

48. The method of claim 4, the method further comprising mounting the bearing mechanism in contact with the shaft, the bearing mechanism rotatable with respect to the shaft.

49. The method of claim 47 wherein the bearing mechanism comprises:
   a roller thrust bearing; and
   a thrust washer, the thrust washer located in contact with the roller thrust bearing.

50. The method of claim 47 wherein the bearing mechanism comprises a spacing ring, the spacing ring located in contact with the shaft and the spacing ring rotatable with respect to the shaft.

51. The method of claim 50 wherein the bearing mechanism comprises a roller thrust bearing, the roller thrust bearing mounted on the spacing ring.

52. The method of claim 50 wherein the bearing mechanism comprises a thrust washer, the thrust washer mounted on the spacing ring.

* * * * *

UNITED STATES PATENT AND TRADEMARK OFFICE
CERTIFICATE OF CORRECTION

PATENT NO. : 5,992,253
DATED : NOVEMBER 30, 1999
INVENTOR(S) : PAUL S. PETERSEN

It is certified that error appears in the above-identified patent and that said Letters Patent is hereby corrected as shown below:

Col. 17, line 59, delete "lack", insert -- rack --

Col. 19, claim 48, line 1, delete "4", insert -- 47 --

Signed and Sealed this

Twenty-seventh Day of February, 2001

*Attest:*

NICHOLAS P. GODICI

*Attesting Officer*    *Acting Director of the United States Patent and Trademark Office*